United States Patent
Woo et al.

(10) Patent No.: US 9,195,882 B2
(45) Date of Patent: Nov. 24, 2015

(54) MOBILE TERMINAL AND GROUP GENERATING METHOD THEREIN

(75) Inventors: Seunghyun Woo, Seoul (KR);
Hyunjung Lee, Seoul (KR); Jiyen Son, Gunpo (KR); Donggwan Im, Seoul (KR); Hyunho Jee, Incheon (KR)

(73) Assignee: LG ELECTRONICS INC., Seoul (KR)

( * ) Notice: Subject to any disclaimer, the term of this patent is extended or adjusted under 35 U.S.C. 154(b) by 264 days.

(21) Appl. No.: 13/081,802

(22) Filed: Apr. 7, 2011

(65) Prior Publication Data

US 2011/0312376 A1     Dec. 22, 2011

(30) Foreign Application Priority Data

Jun. 21, 2010    (KR) .................. 10-2010-0058476

(51) Int. Cl.
| | |
|---|---|
| G06K 9/00 | (2006.01) |
| H04M 1/57 | (2006.01) |
| H04M 1/2745 | (2006.01) |
| G06F 17/30 | (2006.01) |

(52) U.S. Cl.
CPC ...... *G06K 9/00295* (2013.01); *G06F 17/30265* (2013.01); *G06K 9/00221* (2013.01); *G06K 9/00288* (2013.01); *G06K 9/00677* (2013.01); *H04M 1/27455* (2013.01); *H04M 1/274533* (2013.01); *H04M 1/575* (2013.01); *H04M 1/576* (2013.01)

(58) Field of Classification Search
USPC ......... 382/100, 115, 118, 181, 282, 291, 325; 455/414.2, 556.1; 379/201.01, 201.04
See application file for complete search history.

(56) References Cited

U.S. PATENT DOCUMENTS

| | | | | |
|---|---|---|---|---|
| 8,027,541 | B2 * | 9/2011 | Hua et al. ............... | 382/190 |
| 8,204,270 | B2 * | 6/2012 | Tanigawa et al. ...... | 382/100 |
| 8,340,653 | B2 * | 12/2012 | Shimagaki .............. | 382/118 |
| 2007/0009028 | A1 * | 1/2007 | Lee et al. ................ | 382/190 |
| 2007/0035513 | A1 * | 2/2007 | Sherrard et al. ........ | 345/157 |
| 2008/0226174 | A1 | 9/2008 | Hua et al. | |
| 2008/0309617 | A1 * | 12/2008 | Kong et al. ............. | 345/157 |
| 2009/0023472 | A1 * | 1/2009 | Yoo et al. ................ | 382/118 |
| 2009/0037477 | A1 * | 2/2009 | Choi et al. .............. | 707/104.1 |
| 2009/0089316 | A1 * | 4/2009 | Kogan et al. ........... | 707/102 |
| 2009/0154677 | A1 * | 6/2009 | Kunii et al. ............. | 455/415 |
| 2010/0050090 | A1 * | 2/2010 | Leebow .................. | 382/118 |
| 2010/0124363 | A1 | 5/2010 | Ek et al. | |
| 2010/0156834 | A1 * | 6/2010 | Sangster ................. | 382/118 |
| 2010/0162171 | A1 * | 6/2010 | Felt et al. ................ | 715/835 |
| 2010/0287504 | A1 * | 11/2010 | Vance et al. ............ | 715/811 |

FOREIGN PATENT DOCUMENTS

| | | | |
|---|---|---|---|
| CN | 200950262 Y | | 9/2007 |
| JP | 2006165821 A | * | 6/2006 |
| WO | WO 2006/080755 A1 | | 8/2006 |
| WO | WO 2009082814 A1 | * | 7/2009 |

* cited by examiner

*Primary Examiner* — Eric Rush
(74) *Attorney, Agent, or Firm* — Birch, Stewart, Kolasch & Birch, LLP

(57) ABSTRACT

A mobile terminal and group generating method therein are disclosed, by which a group can be generated using at least one character object included in an image currently displayed. The present invention includes displaying at least one image including at least one character object, performing a face recognition process based on the image for recognizing at least one character object on the image, identifying a counterpart corresponding to the recognized character object and generating a group comprising at least one identified counterpart according to a selection input by a user.

15 Claims, 26 Drawing Sheets

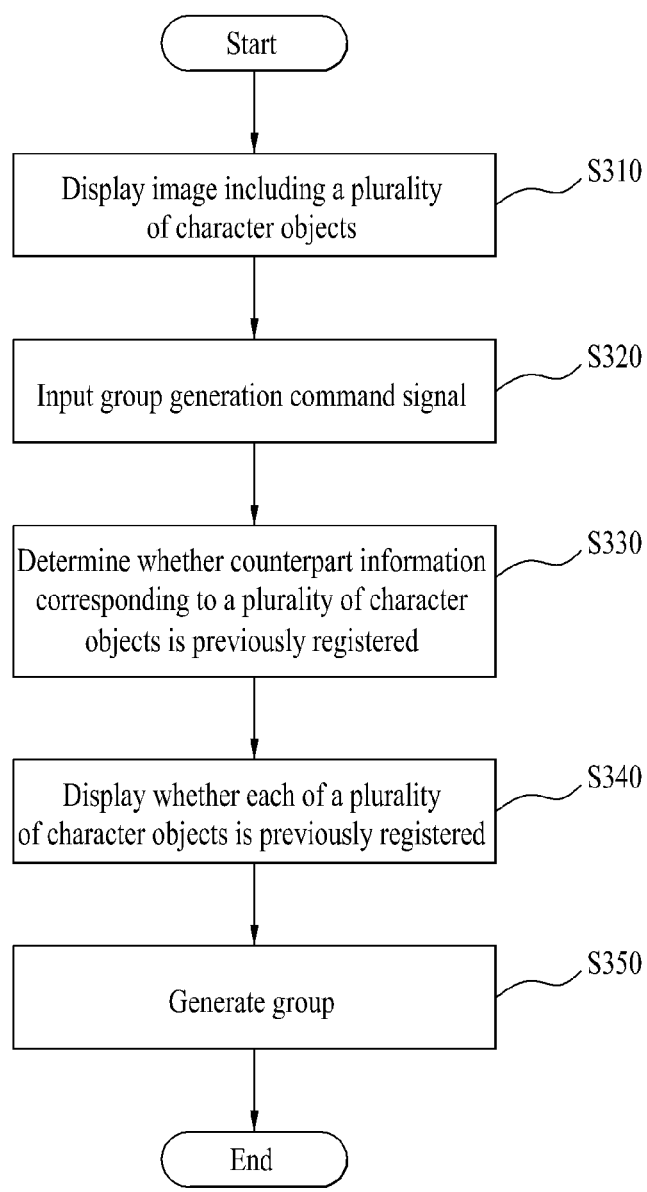

| Add group | | |
|---|---|---|
| Group name | | |
| Jane | 011-111-1111 | Edit |
| Tom | 019-123-1234 | Edit |
| Amy | 010-123-1234 | Edit |
| Julia | 010-444-5555 | Edit |
| Unspecified | | |

```
┌─────────────────────────────────────────┐
│              Add group                  │
│  Group name [            ]              │
│   Jane    011-111-1111        [Edit]    │
│   Tom     019-123-1234        [Edit]    │
│   Amy     010-123-1234        [Edit]    │
│   Julia   010-444-5555        [Edit]    │
│   MIna    010-456-4567        [Edit]    │
│                    [Setting]            │
└─────────────────────────────────────────┘
       632
```

FIG. 6F

```
┌─────────────────────────────────────────┐
│              Add group                  │
│  Group name [            ]              │
│   Jane    011-111-1111        [Edit]    │
│   Tom     019-123-1234        [Edit]    │
│   Amy     010-123-1234        [Edit]    │
│   Julia   010-444-5555        [Edit]    │
│                    [Setting]            │
└─────────────────────────────────────────┘
```

FIG. 7C

| Classmate meeting |  |
|---|---|
| Jane | 011-111-1111 |
| Tom | 019-123-1234 |
| Julia | 010-444-5555 |
| Amy | 010-123-1234 |

FIG. 7D

| Classmate meeting |  |
|---|---|
| Jane | 011-111-1111 |
| Tom | 019-123-1234 |
| Julia | 010-444-5555 |
| Amy | 010-123-1234 |
| MIna | 010-456-4567 |

FIG. 9C
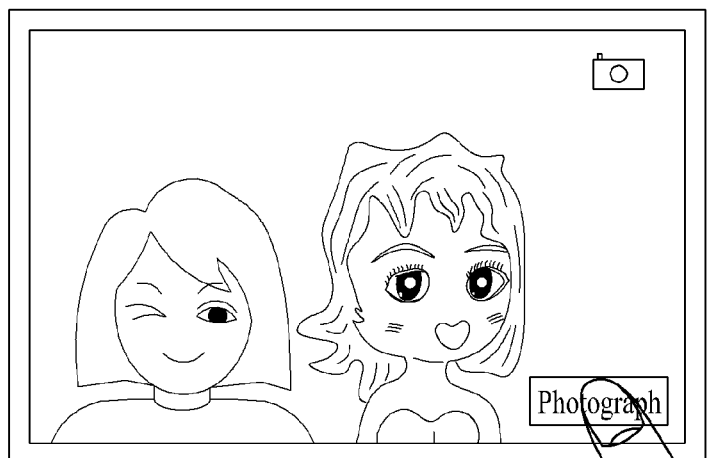
(a)
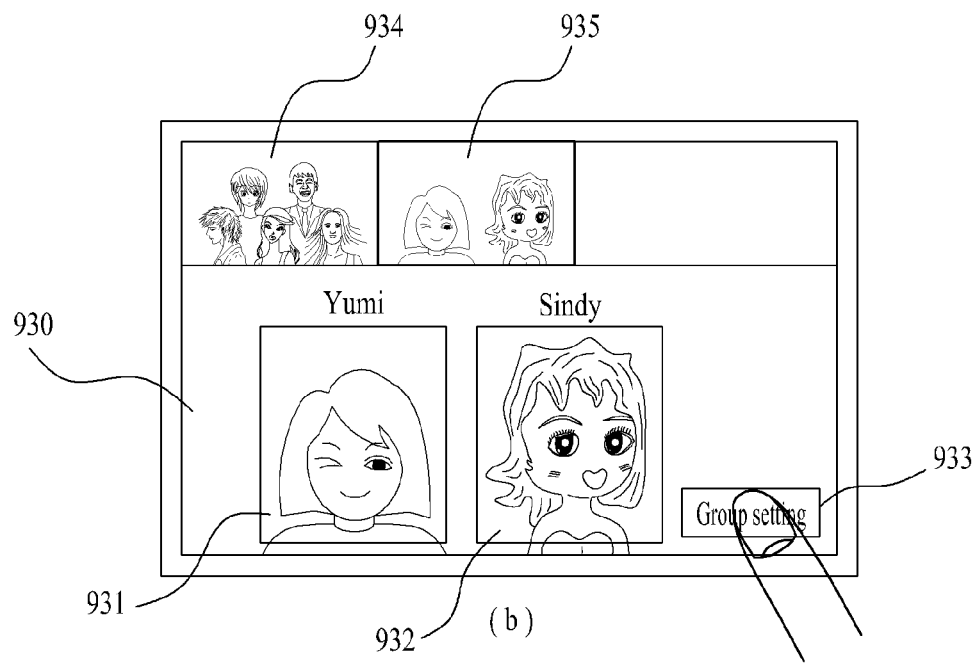
(b)

FIG. 9D

| | Add group | |
|---|---|---|
| Group name | | |
| Jane | 011-111-1111 | Edit |
| Tom | 019-123-1234 | Edit |
| Amy | 010-123-1234 | Edit |
| Julia | 010-444-5555 | Edit |
| Yumi | 011-xxxx-xxxx | Edit |
| Cindy | 010-xxxx-xxxx | Edit |
| | Setting | |

960 — {Jane, Tom, Amy, Julia}
970 — {Yumi, Cindy}

FIG. 9E
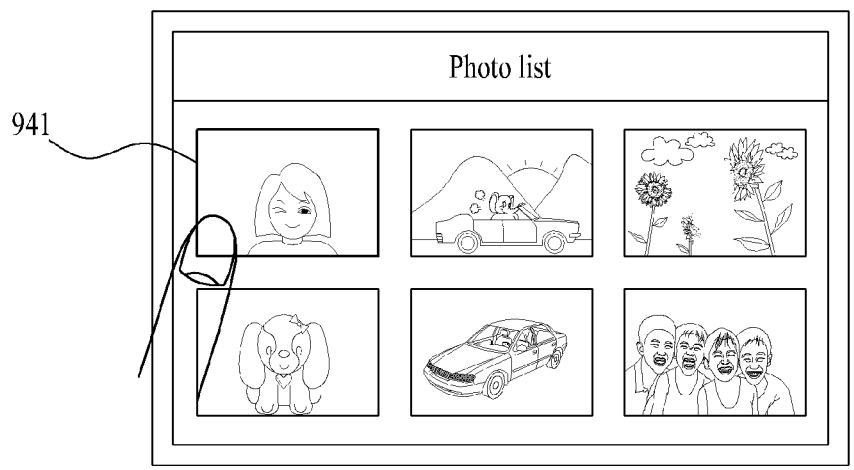
(a)
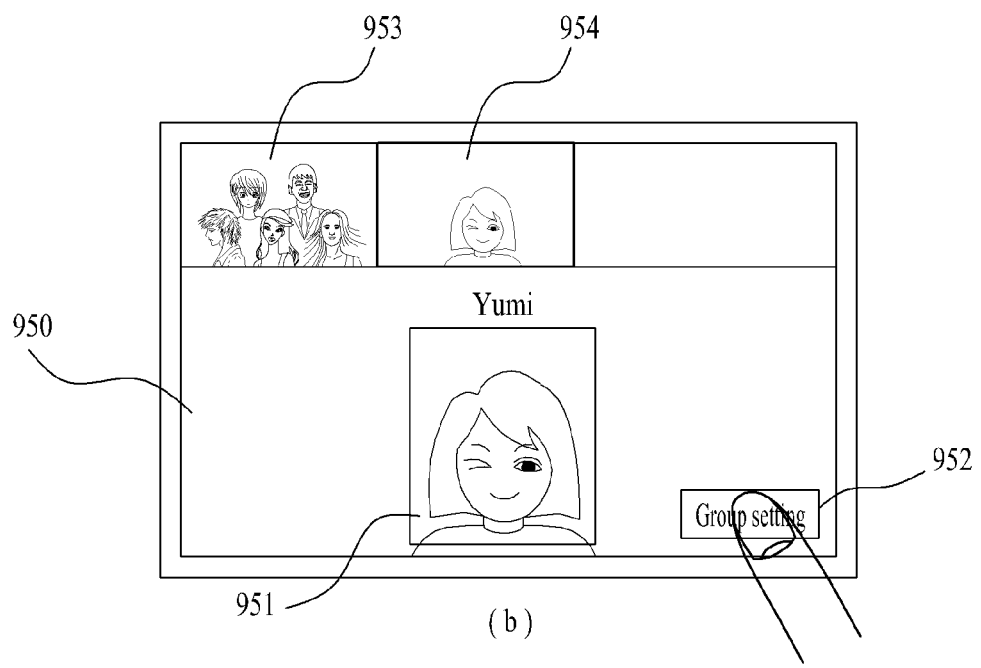
(b)

FIG. 9F

|  | Add group | |
|---|---|---|
| Group name | | |
| Jane | 011-111-1111 | Edit |
| Tom | 019-123-1234 | Edit |
| Amy | 010-123-1234 | Edit |
| Julia | 010-444-5555 | Edit |
| Yumi | 011-xxxx-xxxx | Edit |
| | Setting | |

960 — (bracket around Jane, Tom, Amy, Julia)
980 — Yumi

FIG. 13C

| Add group | |
|---|---|
| Group name | |
| Jane | 011-111-1111 |
| Tom | 019-123-1234 |
| Amy | 010-123-1234 |
| | Setting |

MOBILE TERMINAL AND GROUP GENERATING METHOD THEREIN

This application claims the benefit of earlier filing date and right of priority to Korean Application No. 10-2010-0058476, filed on Jun. 21, 2010, the contents of which are hereby incorporated by reference herein in their entirety.

BACKGROUND OF THE INVENTION

1. Field of the Invention

The present invention relates to a mobile terminal, and more particularly, to a mobile terminal and group generating method therein. Although the present invention is suitable for a wide scope of applications, it is particularly suitable for generating a group including at least one counterpart.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

According to related art, a mobile terminal generates a group including at least one counterpart selected from counterparts of which counterpart information is stored in advance or is able to generate a group including at least one counterpart of which counterpart information is directly inputted by a user.

However, the related art does not provide a method of generating a group conveniently using an image displayed on the mobile terminal.

SUMMARY OF THE INVENTION

Accordingly, the present invention is directed to a mobile terminal and group generating method therein that substantially obviate one or more problems due to limitations and disadvantages of the related art.

An object of the present invention is to provide a mobile terminal and group generating method therein, by which a group can be generated using at least one character object included in at least one image displayed on the mobile terminal.

Throughout this application, "character object" refers to the part of an image displaying at least a part of a person, e.g. a face. Moreover, "counterpart" denotes a contact and "counterpart information" can be stored in a memory of the mobile terminal and includes at least one of a name of the corresponding contact, addresses, phone numbers and the like.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a display unit and a controller. The controller is adapted to analyze images displayed on the display in order to perform a kind of pattern recognition process for recognizing character objects on the images. This process may relate to a face recognition process. When the controller has recognized at least one character object on at least one image, the controller is capable of identifying the one or more character objects on the at least one image based on counterparts, which may be stored e.g. in the mobile terminal or in an external server. Furthermore, the controller is capable of generating a group of counterparts according to a user input. Thus, when an image including one or more character objects is displayed on the mobile terminal, the user may select at least one of the displayed character objects for generating a group including the counterparts corresponding to these character objects. By these means, a user may generate a group using an image and/or image parts, on which the controller has recognized a character object, and/or the counterpart information of counterparts identified on the image. Possibly, the controller groups automatically all image parts of the displayed image, on which character objects have been recognized, and/or counterpart information of all identified counterparts. Alternatively, the user can select among the displayed character objects and/or identified counterparts.

For identifying character objects, the controller may for instance be adapted to compare a character object recognized on the image with counterpart images stored in the mobile terminal or in an external server. Possibly, the image or image part including a recognized character object is transmitted to an external server for identifying the character object, e.g. using a database of counterpart images or social network sites (Twitter, Facebook, Myspace, blogs etc.) in the internet.

Preferably, the controller can modify a previously generated group by deleting and/or adding at least one counterpart according to a user selection. Likewise, the controller may be adapted to modify counterpart information, e.g. a counterpart image, a phone number, an address, a name, a group membership, an email address or a combination thereof. Modifying counterpart information includes adding, deleting and/or changing counterpart information. Also, in case a counterpart image of a counterpart or a group image has been already added to this counterpart or group, the controller may replace the old image with the new one. Of course, a counterpart may be included in more than one group. Similarly, a group may also comprise other groups or may be mixed, i.e. composed of groups and single counterparts.

The at least one image displayed on the display unit may be at least one of a preview image, which is only displayed, an image stored in a memory and an image received from an external server. Thus, a user may generate a group or modify an already existing group using a preview image, which is only temporarily stored.

In a preferred embodiment, more than one image can be displayed on the display unit. In case that more than one of the displayed images includes at least one character object, respectively, the user may select character objects on different images for generating a group.

In a further preferred embodiment, a group image corresponding to a group may be generated by assembling counterpart images of counterparts included in the group to a group image. Here, a background image may be selectable for a user, so that the counterparts may be assembled on the selected background image. The group image may be viewable in a photo album stored in the mobile terminal. Possibly, the created group image may be sent to some or all members of the group based on a user selection or automatically, wherein the stored counterpart information of the respective counterparts is used for transmitting the group image.

Preferably, the controller is adapted to transmit an image, e.g. a group image, a counterpart image, a photographed image or a preview image, to at least one counterpart identified on this image using the corresponding counterpart information stored in the mobile terminal. Furthermore, the controller may be adapted to automatically group the counterparts, to which an image is transmitted, after or when transmitting an image. Similarly, the controller may be adapted to generate a group including counterparts identified on a photographed image or a preview image.

When an image is displayed on the mobile terminal, the controller may be adapted to indicate, whether a character object recognized on the displayed image is registered in the mobile terminal. In case that a recognized character object cannot be identified, the controller may indicate the character object as being unregistered. The user may register an unidentified character object by manually inputting counterpart information, e.g. a name, an address, a phone number, an email address, a counterpart image, a group membership, etc. or a combination thereof. Additionally or alternatively, the controller may register the unidentified character object by requesting corresponding counterpart information from an external server or a social network site.

Preferably, the mobile terminal comprises an input unit, such as at least one of a touch sensitive display, a touch pad, a keypad or the like. A selection input of the user and/or the user input for generating and/or modifying a group may relate to at least one of a touch action, a multi-touch input, a drawing action of drawing a closed region around character objects, a touch and drag action and a gesturing action.

In another embodiment, the controller is adapted to define an image part, on which the controller has recognized a character object, as a separately selectable region, e.g. for including/excluding the character object in/from a group, for starting a phone call or for transmitting an email, if the recognized character object is registered or stored as a counterpart in the mobile terminal, or in case that the recognized character object cannot be identified or is not registered, for starting the registration of the recognized character object as a new counterpart.

According to another aspect of the present invention, a method is provided for generating a group in a mobile terminal, the method comprising the steps of displaying at least one image including at least one character object; performing a face recognition process based on the image for recognizing at least one character object on the image; identifying a counterpart corresponding to the recognized character object; and generating a group comprising at least one identified counterpart according to a selection input by a user. The method may be adapted to be performed in one of the embodiments of a mobile terminal according to the present invention described above.

Preferably at least one counterpart is included in more than one group.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a flowchart for a method of generating a group in a mobile terminal according to one embodiment of the present invention;

FIGS. 6A to 6F are diagrams for generating a group including a counterpart corresponding to a character object included in an image according to the present invention;

FIGS. 7A to 7D are diagrams for adding a counterpart corresponding to a character object included in an image to a previous group according to the present invention;

FIGS. 9A to 9F are diagrams for specifying a counterpart to be included in a group using a plurality of images according to the present invention;

FIGS. 13A to 13C are diagrams for generating a group including counterparts corresponding to the rest of character objects except a specific character object among a plurality of character objects included in an image according to the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
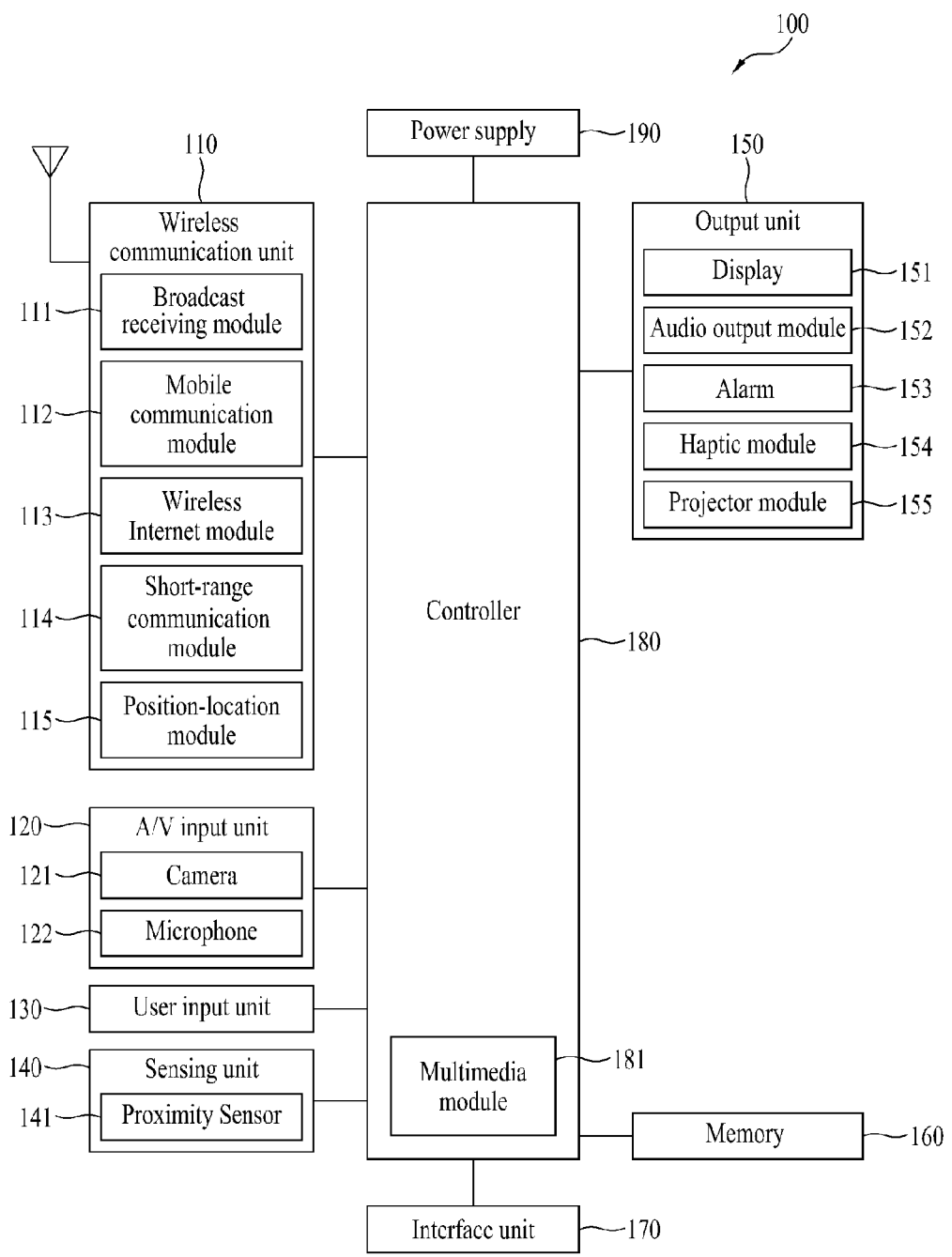
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
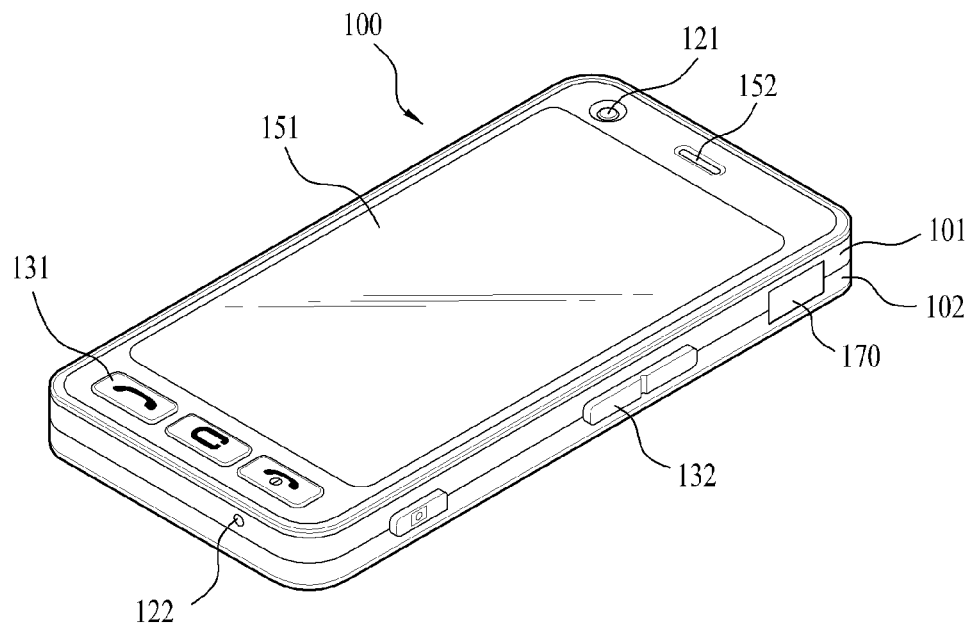
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display unit 151, an audio output unit 152, a camera 121, user input units 130/131 and 132, a microphone 122, an interface 180 and the like can be provided to the terminal body, and more particularly, to the front case 101.

The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display unit 151 or the like can be inputted to the second manipulating unit 132.

Figure 2B:
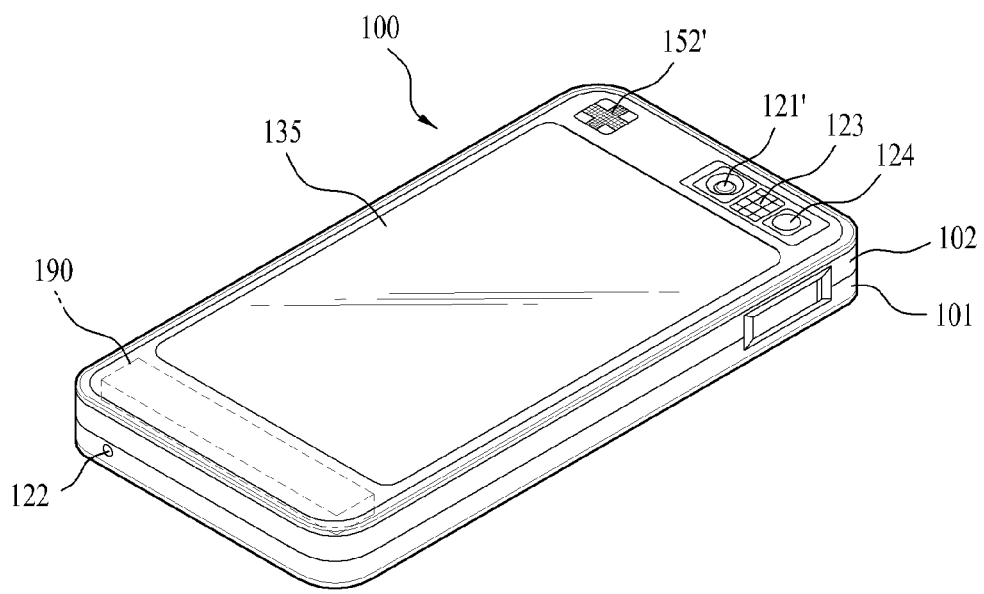
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the former camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display unit 151. In this case, if the display unit 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display unit 151 of the front case 101. The touchpad 135 can be provided in rear of the display unit 151 in parallel. The touchpad 135 can have a size equal to or smaller than that of the display unit 151.

First of all, a mobile terminal mentioned in the following description can include at least one of the components shown in FIG. 1.

In the following description, a method of generating a group in a mobile terminal is explained in detail with reference to the accompanying drawings.

FIG. 3 is a flowchart for a method of generating a group in a mobile terminal according to one embodiment of the present invention.

Referring to FIG. 3, the mobile terminal 100 displays an image including a plurality of character objects via the display unit 151 under the control of the controller 180 [S310].

In this case, the character object may mean a person among a plurality of objects included in the image. And, the image can include a still picture or a moving picture.

In the displaying step S310, the mobile terminal 100 is able to display one of an image inputted externally via the camera 121, an image stored in the memory 160 and an image received from an external server.

For instance, the image inputted via the camera 121 can include a preview image, i.e. an image, which is just displayed, but not permanently stored. The image stored in the memory 160 can include an image previously taken via the camera 121 or an image received from an external server. And, the image received from the external server can include a real-time image provided by the external server.

The mobile terminal 100 receives an input of a group generation command signal via the user input unit 130 [S320].

In this case, a group can include at least one counterpart of which information (e.g., such personal information as a counterpart image, a phone number, a name, a photo, an email address, a blog address, etc.) (hereinafter named counterpart information) is registered with or stored in the mobile terminal 100. For instance, the registered or stored counterpart information can be stored by being linked to an address book related application. Moreover, information (e.g., a group name, information on a counterpart configuring the group, the number of group members, etc.) on a group including at least one counterpart can be stored by being linked to the address book related application.

And, the group generation command signal can include a signal for commanding a generation of a group including at least one counterpart.

The inputting step S320 is explained in detail with reference to FIG. 4A and FIG. 4B as follows.

Figure 4A:
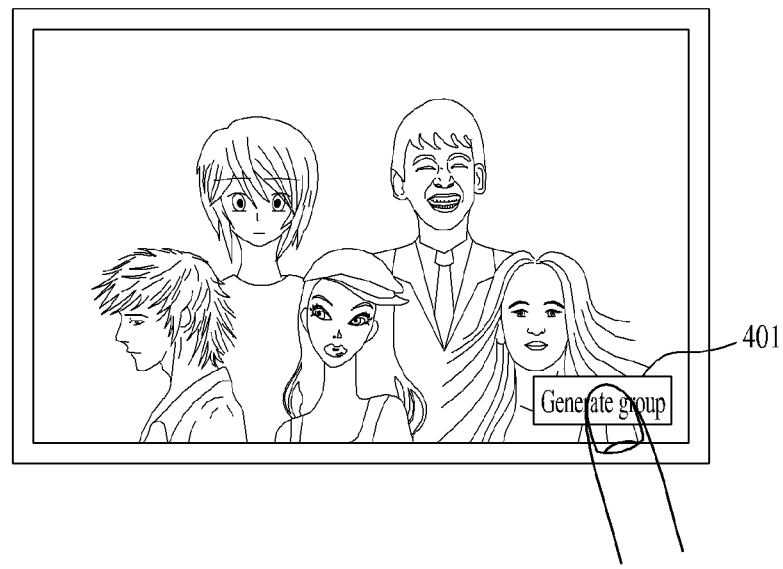
FIG. 4A and FIG. 4B are diagrams for receiving an input of a group generation command signal in the course of displaying an image including a plurality of character objects according to the present invention.
Figure 4B:
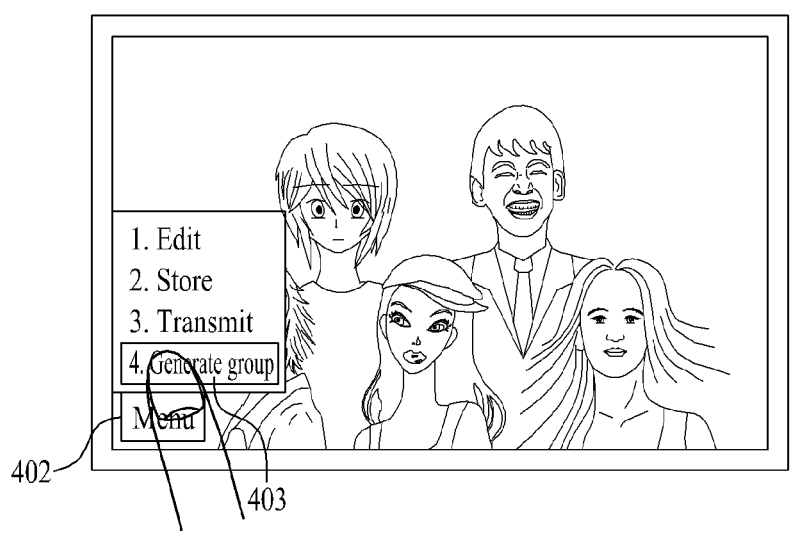

FIG. 4A and FIG. 4B are examples for receiving an input of a group generation command signal in the course of displaying an image including a plurality of character objects according to the present invention.

Referring to FIG. 4A, if a key zone 401 provided to one region of a screen for receiving an input of a group generation command signal is selected by a user, the mobile terminal 100 is able to receive the group generation command signal.

Alternatively or additionally, referring to FIG. 4B, if the user selects a menu item 403 corresponding to a group generation is selected through a menu 402 search, the mobile terminal 100 is able to receive the group generation command signal.

Meanwhile, in case of detecting a terminal motion (e.g., a shaking action, an inclining action, etc.) corresponding to the group generating command or a touch action corresponding to the group generating command, the mobile terminal 100 is able to receive an input of the group generation command signal [not shown in the drawing].

Referring now to FIG. 3, in case of receiving the input of the group generation command signal in the inputting step S320, the mobile terminal 100 determines whether counterpart information corresponding to each of a plurality of the character objects included in the currently displayed image is previously registered with the mobile terminal 100 under the control of the controller 180 [S330].

In this case, the previously registered counterpart information can be stored in the memory 160. Moreover, the previously stored counterpart information is stored by being limited to the address book related application or can be searched according to an execution of the address book related application.

Moreover, since the previously stored counterpart information includes a corresponding counterpart image, the mobile terminal 100 is able to use the included counterpart image in determining whether the counterpart information of the corresponding character object is registered previously. Since the previously stored counterpart information includes a phone number or an identification number of a corresponding counterpart terminal, the mobile terminal is able to use the phone or identification number in determining whether the counterpart information of the corresponding character object is registered previously. Therefore, the mobile terminal 100 compares the included phone number to a phone number of a terminal corresponding to each of a plurality of the character objects. If the two phone numbers are matched, the mobile terminal 100 is able to determine that the counterpart information of the corresponding character object is registered previously.

In the following description, the determining step S330 is explained in detail.

First of all, a determining process using a counterpart image is described as follows.

The controller 180 extracts a partial image corresponding to each of a plurality of the character objects included in the currently displayed image. Thus, the controller 180 is able to recognize character objects, e.g. a face or a person, within an image, e.g. using a sort of pattern recognition. This process is also referred to as face recognition. Then, the controller 180 is able to search a plurality of the counterpart images stored in the memory for counterpart images matching the extracted partial images. For instance, the controller 180 is able to search the memory 160 for the counterpart image indicating the same character object of the character object corresponding to the extracted partial image. In doing so, the controller 180 obtains a feature point (e.g., eye, nose, mouth, look, etc.) of the extracted character object and is then able to search for the counterpart image matching the obtained feature point. By these means, the controller 180 is able to identify a character object as a counterpart (i.e. a person stored in the mobile terminal as a contact) among the recognized character objects on the image, e.g. by comparing each recognized character object with counterpart images stored in the mobile terminal or in an external server.

In case of discovering (or searching) the counterpart image matching the extracted partial image, the controller 180 is able to determine that the counterpart information of the character object corresponding to the extracted partial image is previously registered.

Moreover, in case of determining that the counterpart information corresponding to a specific one of a plurality of the character objects is previously registered, the controller 180 is able to extract the counterpart information (counterpart image included) corresponding to the specific character object from the memory 160.

In the following description, the determining process using the counterpart phone number is explained. In one embodiment, the mobile terminal 100 transmits its location information to an external server and the terminal receives a phone number of at least one other terminal or correspondent terminal, which is located within a predetermined distance from the terminal, from the external server. The server can check for correspondent terminals in the surroundings of the terminal using the transmitted location information. The mobile terminal 100 searches the received phone numbers for a phone number of a correspondent terminal located in the direction, in which the terminal is facing, e.g. in the direction the camera 121 is aimed at. Alternatively, the external server may only transmit phone numbers of those correspondent terminals, which are located in the facing direction of the mobile terminal. The searched phone number can be the phone number corresponding to a character object included in a currently displayed image. Thus, the searched phone number can be displayed with the corresponding character object in the currently displayed image (e.g. Augmented Reality, AR). For instance, if the surroundings of the user are displayed on the mobile terminal 100 via the camera 121, i.e. as a preview or temporary image or when filming, phone numbers of correspondent terminals in the surroundings may be displayed on the respective character object displayed on the current image. It is also possible that the mobile terminal determines whether at least one of the phone numbers received from the external server corresponds to a phone number of a counterpart stored in the memory, thus indicating counterparts in the surroundings. Therefore, the terminal may determine based on the received phone numbers whether a displayed character object is already registered.

In an alternative embodiment, the mobile terminal 100 transmits at least one image part corresponding to at least one character object to an external server and the mobile terminal 100 receives a phone number of the at least one correspondent terminal corresponding to the transmitted image part from the external server. The external sever may store for a plurality of terminals the phone number of the terminal and an image of the terminal user, e.g. like a counterpart image. Then, the external sever can search the stored images for an image matching the transmitted image part corresponding to a character object and transmit the corresponding phone number to the mobile terminal 100. The external sever may include a SNS (Social Network Service) server, an IMS (Instant Messaging Service) server, or a separate server for executing a function according to this invention. Possibly, both methods can be combined.

In the mobile terminal 100, the controller 180 checks a phone number of a terminal corresponding to each of a plurality of the character objects included in the currently displayed image and is then able to search a plurality of counterpart phone numbers stored in the memory 160 for a phone number matching the checked phone number.

If the same counterpart phone number of the checked phone number is discovered, the controller 180 is able to determine that the counterpart information of the character object corresponding to the checked phone number is previously registered.

In case of determining whether counterpart information of at least one of a plurality of the character objects is previously registered in the determining step S330, the mobile terminal may display a presence or absence of pre-registration of the counterpart information on each of a plurality of the character objects under the control of the controller 180 [S340].

Moreover, the mobile terminal 100 is able to display the previously registered counterpart information on each of the at least one character object, of which counterpart information is determined as previously registered, among a plurality of the character objects under the control of the controller 180.

This is explained in detail with reference to FIGS. 5A to 5C as follows.

Figure 5A:
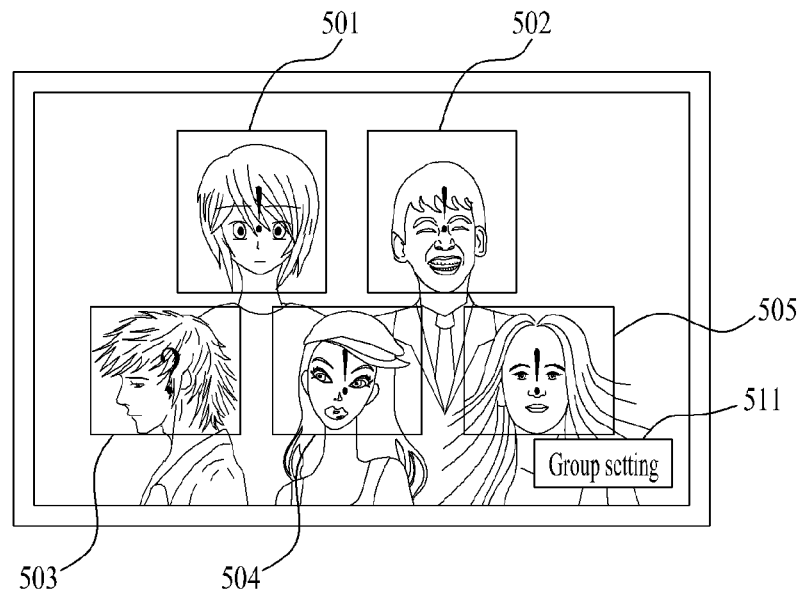
FIGS. 5A to 5C are diagrams for displaying whether a character object included in an image is registered with a terminal according to the present invention.
Figure 5B:
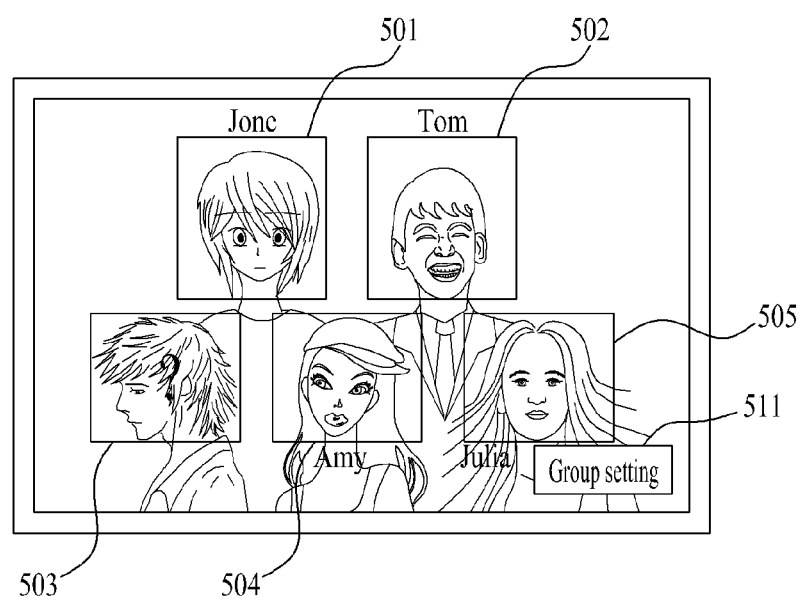
Figure 5C:
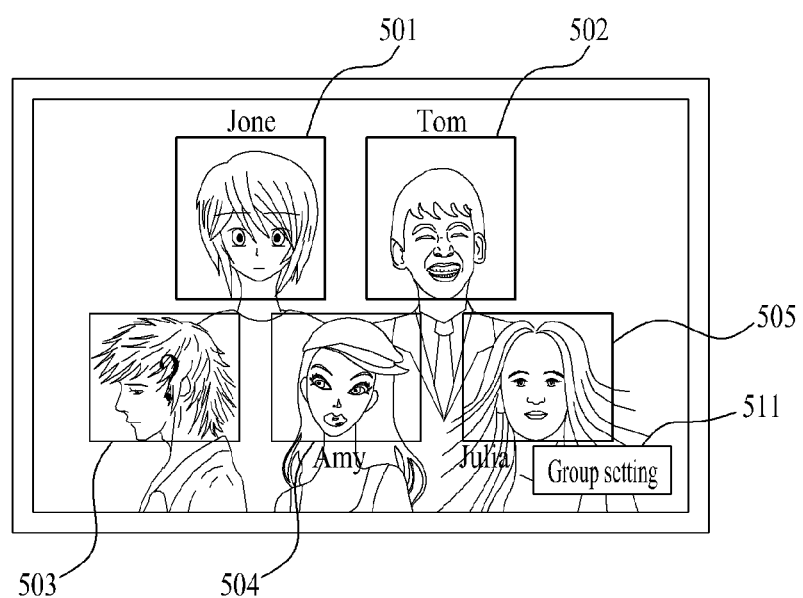

FIGS. 5A to 5C are examples for displaying whether a character object included in an image is registered with a terminal according to the present invention.

Referring to FIG. 5A, the mobile terminal 100 is able to display whether counterpart information on each of a plurality of character objects 501 to 505 included in a currently displayed image is previously registered.

For instance, the mobile terminal 100 is able to mark an indicator (?) indicating 'unregistered' on the third character object 503 of which counterpart information is unregistered. And, the mobile terminal 100 is able to mark an indicator (!) indicating 'registered' on each of the first, second, fourth and fifth character objects 501, 502, 504 and 505.

Referring to FIG. 5B, the mobile terminal is able to display corresponding counterpart information on each of the first, second, fourth and fifth character objects 501, 502, 504 and 505, of which counterpart information are registered previously, among a plurality of the character objects 501 to 505 included in the currently displayed image.

For instance, the mobile terminal 100 is able to mark corresponding names Jane, Tom, Amy and Julia on the first, second, fourth and fifth character objects 501, 502, 504 and 505 of which counterpart information are previously registered, respectively. Moreover, the counterpart information displayable for each of a plurality of the character objects can include a counterpart phone number, a counterpart email address, a counterpart blog address, a counterpart SNS site address, a counterpart image and the like.

Referring to FIG. 5C, in case that counterparts corresponding to the first, second and fifth character objects 501, 502 and 505 among the counterpart information registered first, second, fourth and fifth character objects 501, 502, 504 and 505 belong to the previously generated same group, the first, second and fifth character objects 501, 502 and 505 can be distinguishably displayed.

Referring now to FIG. 3, in case of receiving an input of the group generation command signal in the inputting step S320, the mobile terminal 100 generates a group including at least one counterpart corresponding to at least one of a plurality of the character objects included in the currently displayed image [S350].

In particular, the generating step S350 is able to generate at least one of a group including counterparts corresponding to all of a plurality of object characters included in a currently displayed image, a group including a counterpart corresponding to a character object of which counterpart information is previously registered among a plurality of character objects, a group including a counterpart corresponding to a character object of which counterpart information is unregistered among a plurality of character objects, and a group including a character object directly selected from a plurality of character objects by a user.

Moreover, in case of the character object of which counterpart information is unregistered, the group generating process can be performed after completion of counterpart information registration.

The group generating step S350 is further explained in detail with reference to the accompanying drawings as follows.

FIGS. 6A to 6F are diagrams for newly generating a group including a counterpart corresponding to a character object included in an image according to the present invention. For clarity and convenience, assume that a group generation command signal is inputted according to a user selection of a key zone 511 for receiving an input of the group generation command signal.

Figure 6A:
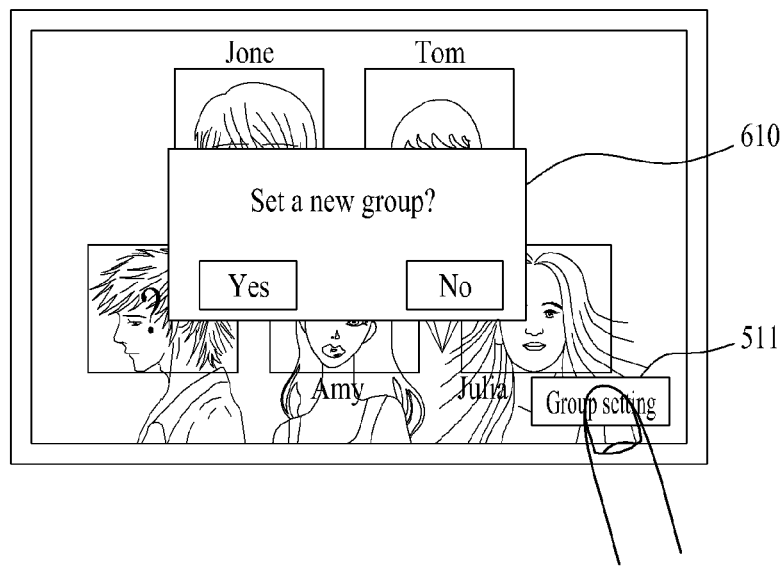

Referring to FIG. 6A, in case of receiving an input of a group generation command signal, the mobile terminal 100 is able to display a window 610 for enabling a user to select whether to generate a new group using a plurality of character objects included in a currently displayed image.

Figure 6B:
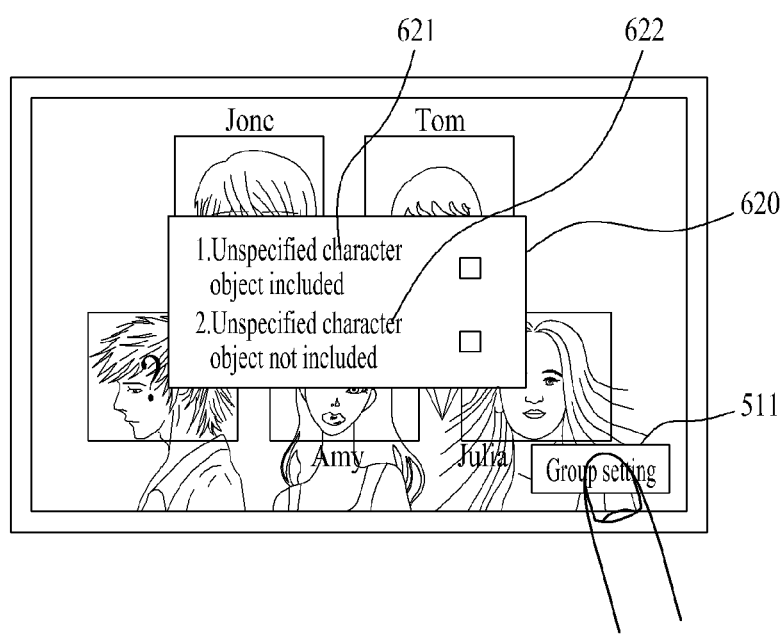

Referring to FIG. 6B, if 'group generation (yes)' is selected in FIG. 6A, the mobile terminal 100 is able to display a window 620 for enabling a user to select whether a character object of which counterpart information is unregistered is included or not.

Of course, the mobile terminal 100 is able to determine whether a character object of which counterpart information is unregistered is included or not on its own irrespective of a user selection.

Figures 6C, 6D:

FIGS. 6C to 6E show a case that 'unregistered character object included' 621 is selected in FIG. 6B.

Referring to FIG. 6C, the mobile terminal 100 is ale to display a screen for adding a new group. In the screen, counterpart information (e.g., name and phone number) corresponding to each of the first, second, fourth and fifth character objects 501, 502, 504 and 505 of which counterpart information is previously registered is included and an item 631 corresponding to the third character object 503 of which counterpart information is unregistered can be included as well.

Referring to FIG. 6D, if the unregistered item 631 is selected in FIG. 6C, the mobile terminal 100 is able to display a screen for receiving a registration of the counterpart information corresponding to the third character object 503.

Therefore, the mobile terminal 100 is able to register the counterpart information inputted via the screen as the counterpart information (e.g., name, phone number, email address, blog address, etc.) corresponding to the third character object 503. In this case, an image part corresponding to the third character object 503 can be set to a corresponding counterpart image.

Referring to FIG. 6E, if the registration of the counterpart information 632 on the third character object 503 is completed in FIG. 6D, the mobile terminal 100 is able to generate a new group including all counterparts corresponding to a plurality of character objects including the counterpart Mina corresponding to the third character object 503.

FIG. 6F shows a case that 'unregistered character object not included' 622 is selected in FIG. 6B.

Referring to FIG. 6F, the mobile terminal 100 is able to generate a new group including the registered counterparts corresponding to the first, second, fourth and fifth character objects 501, 502, 504 and 505, of which counterpart information is previously registered, except the third character object 503 of which counterpart information is unregistered.

Moreover, referring to FIG. 6C, FIG. 6E or FIG. 6F, the mobile terminal 100 receives an input of a title or name of a group, which is newly generated using a plurality of character objects, from a user and then sets a group name. Alternatively, the mobile terminal 100 is able to set a group name to a name of an image including a plurality of character objects.

FIGS. 7A to 7D are diagrams for adding a counterpart corresponding to a character object included in a currently displayed image to a previous group according to the present invention. For clarity and convenience, assume that a group generation command signal is inputted according to a user selection of a key zone 511 for receiving an input of the group generation command signal. And, assume that counterparts Jane, Tom and Julia corresponding to first, second and fifth character objects 501, 502 and 505 belong to the same group among the previously generated groups.

Figure 7A:
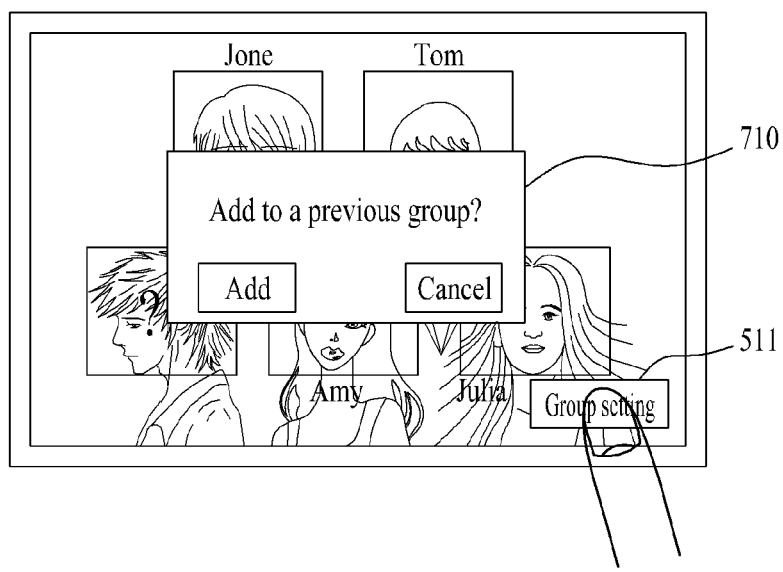

Referring to FIG. 7A, in case of receiving a group generation command signal, the mobile terminal is able to display a window 710 for enabling a user to select whether to add a plurality of counterparts corresponding to a plurality of character objects included in a currently displayed image to a previous group.

Figure 7B:
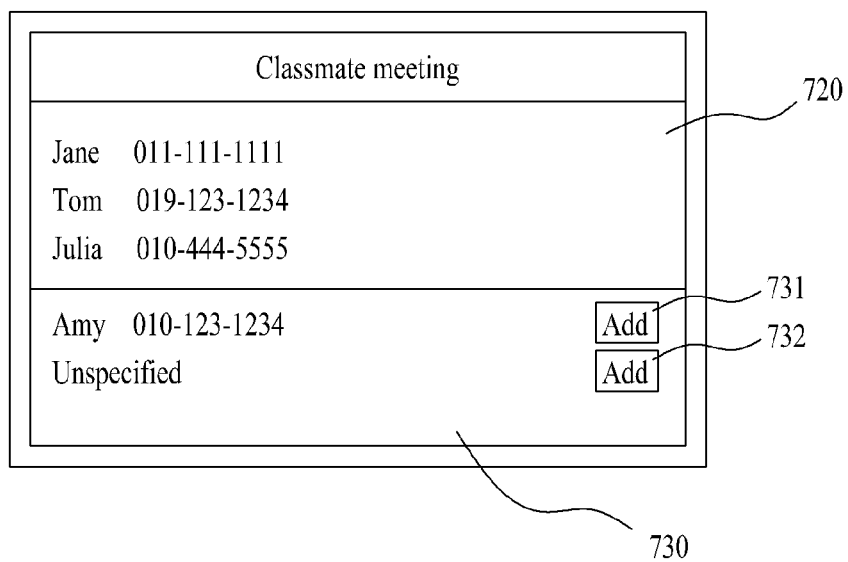

Referring to FIG. 7B, the mobile terminal 100 displays a first region 720 representing a group 'classmate meeting', to which the counterparts Jane, Tom and Julia corresponding to the first, second and fifth character objects 501, 502 and 505 belong, and is also able to display a second region 730 representing information on the third and fourth object characters 503 and 504 failing to belong to the 'classmate meeting'.

In particular, since the counterpart information of the fourth character object 504 is previously registered, the registered counterpart information can be displayed. Since the counterpart information of the third character object 503 is unregistered, an item for the counterpart information registration can be displayed.

Referring to FIG. 7C, in case of receiving an input of an add command signal for adding the fourth character object 504 to the 'classmate meeting' (i.e., first key zone 731 is selected) in FIG. 7B, the mobile terminal 100 is able to add the counterpart corresponding to the fourth character object 504 to the 'classmate meeting'.

Referring to FIG. 7D, in case of receiving an input of an add command signal for adding each of the third and fourth character objects 503 and 504 to the 'classmate meeting' (i.e., first key zone 731 and second key zone 732 are selected) in FIG. 7B, the mobile terminal 100 is able to add the counterparts corresponding to the third and fourth character objects 503 and 504 to the 'classmate meeting'.

In doing so, regarding the third character object 503, a counterpart information registration procedure can be performed prior to the addition to the 'classmate meting'.

FIGS. 8A to 8D are examples for generating a group including a counterpart corresponding to a character object selected by a user from character objects included in a currently displayed image according to the present invention.

Figure 8A:
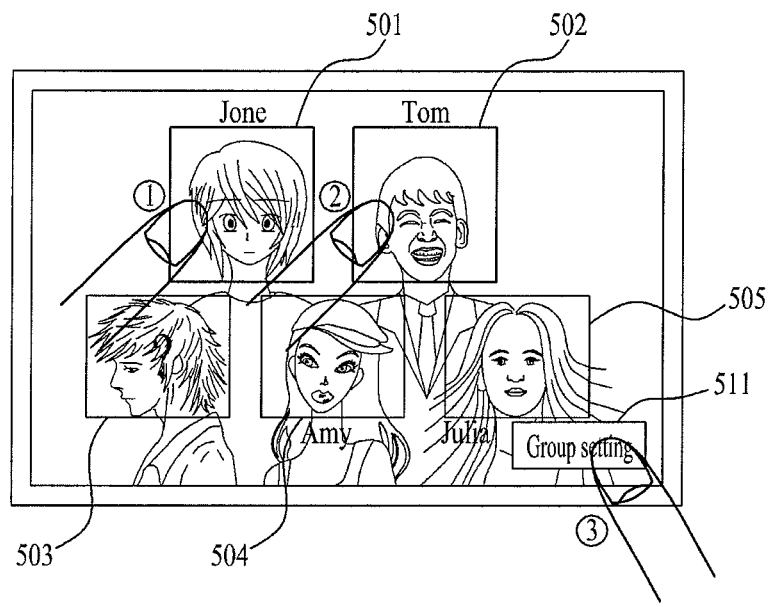
FIGS. 8A to 8D are diagrams for generating a group including a counterpart corresponding to a character object selected by a user from character objects included in an image according to the present invention.

Referring to FIG. 8A, in case of receiving an input of a touch action 1 on a first character object 501, an input of a touch action 2 on a second character object 502, and an input of a touch action 3 on a key zone 511 for inputting a group generation command signal from a user, the mobile terminal 100 is able to select counterparts Jane and Tom corresponding to the first and second character objects 501 and 502 as members of a group to newly generate.

Figure 8B:
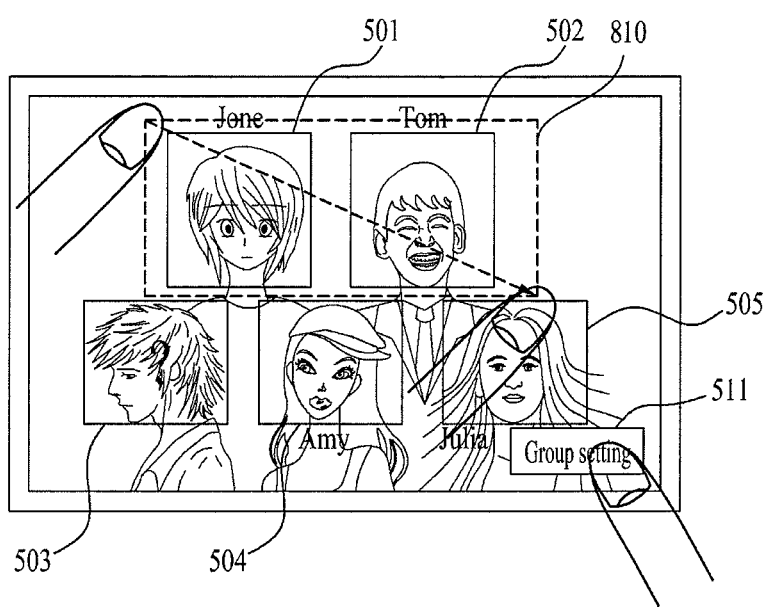

Referring to FIG. 8B, in case of receiving an input of a touch & drag action for setting a region 810 including the first and second character objects 510 and 502 and an input of a touch action on the key zone 511 from a user, the mobile terminal 100 is able to select counterparts Jane and Tom corresponding to the first and second character objects 501 and 502 as members of a group to newly generate.

Figure 8C:
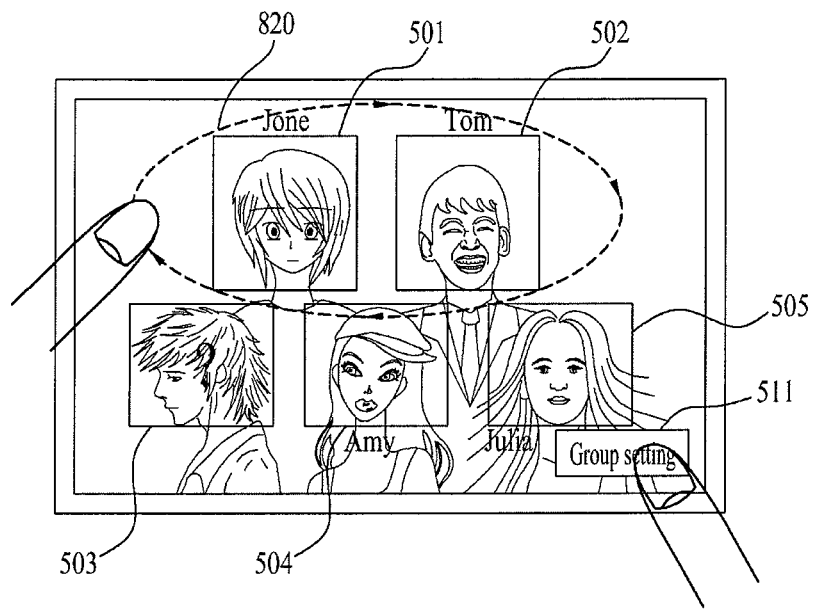

Referring to FIG. 8C, in case of receiving an input of an action of drawing a closed region 820 including the first and second character objects 501 and 502 and an input of a touch action on the key zone 511 from a user, the mobile terminal 100 is able to select counterparts Jane and Tom corresponding to the first and second character objects 501 and 502 as members of a group to newly generate.

Figure 8D:
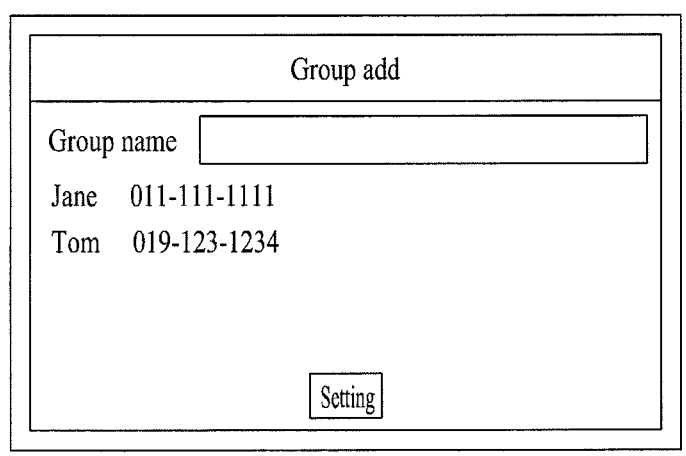

FIG. 8D shows a screen for receiving an input of information on a group including counterparts Jane and Tom corresponding to the first and second character objects 501 and 502 as members of the group.

Referring to FIG. 8D, after a group name has been inputted, if a setting key is selected, a group including Jane and Tom can be newly generated.

FIGS. 9A to 9F are diagrams for specifying a counterpart to be included in a group using a plurality of images according to the present invention.

Figure 9A:
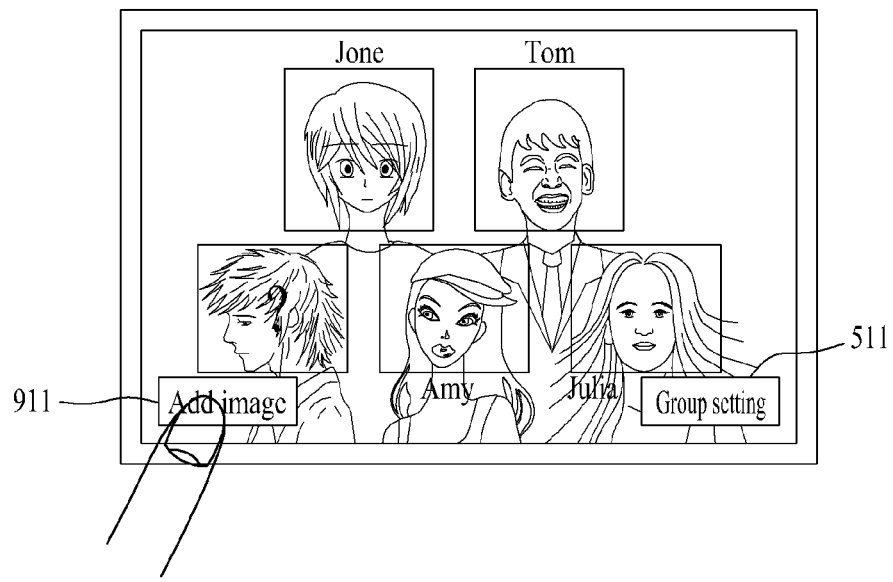

Referring to FIG. 9A, while displaying a first image including a plurality of character objects, in case of attempting to add a character object included in another image except the first image to members of a group to be newly generated, the mobile terminal 100 is able to receive a selection of a key zone 911 corresponding to an image add command from a user.

Of course, the image add command can be selected via a selection of a corresponding menu item through a menu search as well as a selection of the key zone 911.

Figure 9B:
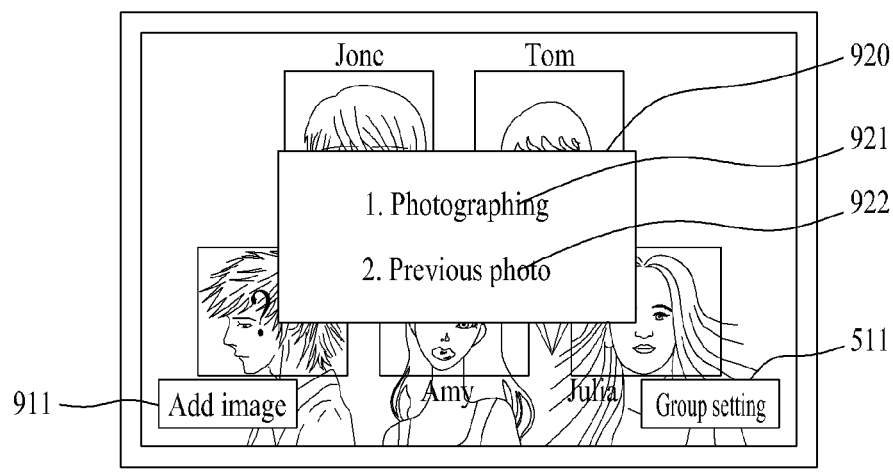

Referring to FIG. 9B, if the key zone 911 is selected in FIG. 9A, the mobile terminal 100 is able to display a window 920 for enabling a user to select whether to photograph an image to add using the camera 121 ['photographing' 921] or select an image to add from images previously stored in the memory 160 ['previous photos' 922].

FIG. 9C and FIG. 9D show the case that the 'photographing' 921 is selected in FIG. 9B.

Referring to FIG. 9C, the mobile terminal 100 displays an image (at least one character object included) inputted via the camera 121. In case of receiving an input of a photograph command signal from a user, the mobile terminal 100 is able to photograph the currently inputted image [a]. In the following description, the photographed image shall be named a second image. The photographed image may also relate to a preview image, i.e. an image, which is just displayed and only temporarily stored.

Subsequently, the mobile terminal 100 displays the photographed second image 930 and is able to display the registered counterpart information on character objects 931 and 932 included within the second image [b]. Moreover, the mobile terminal 100 displays first and second image indicators 934 and 935 of the first and second images on a prescribed region of the screen. If the first image indicator 934 is selected, the mobile terminal 100 is able to display the first image on the screen. If the second image indicator 935 is selected, the mobile terminal 100 is able to display the second image on the screen.

Referring to FIG. 9D, if a zone 'group setting' 933 is selected in FIG. 9C (b), the mobile terminal 100 is able to newly generate a group including counterparts Jane, Tom, Amy and Julia 960 respectively corresponding to the character objects 501, 502, 504 and 505 included in the first image and counterparts Yumi and Cindy 970 respectively corresponding to the character objects 931 and 932 included in the second image.

FIG. 9E and FIG. 9F show a case that the 'previous photos' 922 is selected in FIG. 9B.

Referring to FIG. 9E, the mobile terminal 100 displays a plurality of images stored in a memory 100 and is then able to receive an input selection action 941 on a third image 950 (character object included) from a user [a].

Subsequently, the mobile terminal 100 displays the selected third image 950 and is able to display the registered counterpart information on a character object 951 included in the third image [b]. Moreover, the mobile terminal 100 displays first and third image indicators 934 and 954 of the first and third images on a prescribed region of the screen. If the first image indicator 934 is selected, the mobile terminal 100 is able to display the first image on the screen. If the third image indicator 954 is selected, the mobile terminal 100 is able to display the third image on the screen.

Referring to FIG. 9F, if a zone 'group setting' 952 is selected in FIG. 9E (b), the mobile terminal 100 is able to newly generate a group including counterparts Jane, Tom, Amy and Julia 960 respectively corresponding to the character objects 501, 502, 504 and 505 included in the first image and a counterpart Yumi 980 corresponding to the character object 951 included in the third image.

Figures 10A, 10B:
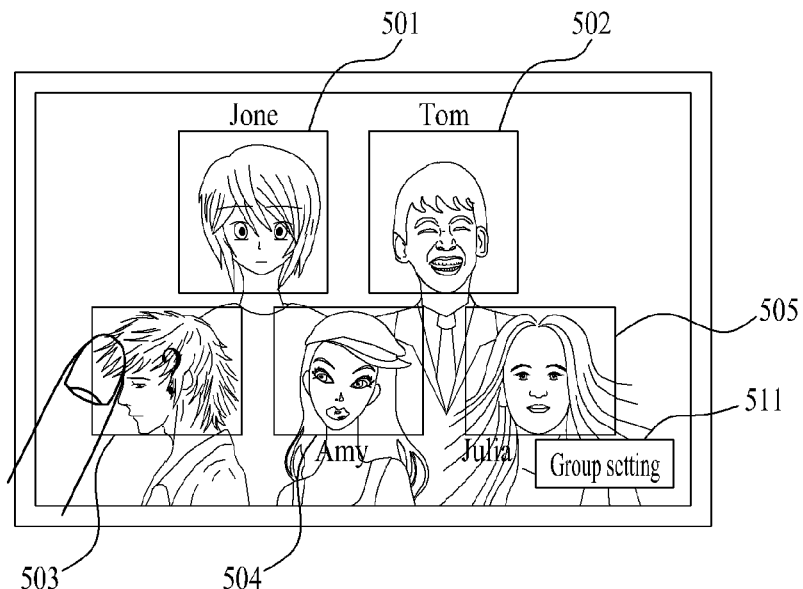
FIGS. 10A to 10C are diagrams for registering user information on an unspecified character object included in an image according to the present invention.
Figure 10C:
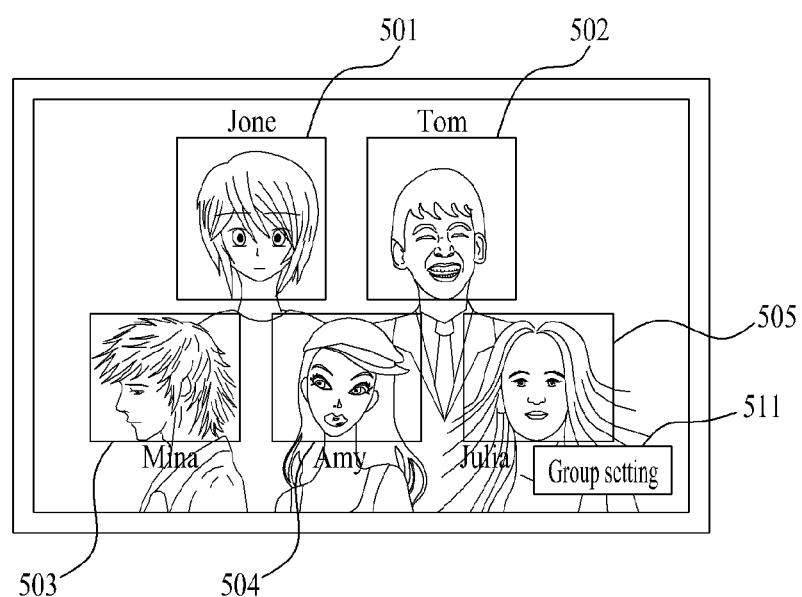

FIGS. 10A to 10C are diagrams for registering user information on an unspecified character object included in a currently displayed image according to the present invention.

Referring to FIG. 10A, the mobile terminal 100 is able to receive an input or a selection action on a third character object 503 of which counterpart information is unregistered from a plurality of character objects included within a currently displayed image.

In case of receiving the input of the selection action on the unregistered third character object 503, the mobile terminal 100 is able to receive an input of an information registration command signal for the unregistered third character object 503.

Optionally, the information registration command signal for the unregistered third character object 503 can be inputted in various ways.

Referring to FIG. 10B, the mobile terminal displays a screen for receiving an input of the counterpart information corresponding to the third character object 503 and is then able to receive an input of such user information as counterpart information (e.g., name, phone number, email address, etc.) from a user via the displayed screen. In doing so, a counterpart image can be automatically set to an image part corresponding to the third character object 503.

Referring to FIG. 10C, if the registration of the counterpart information on the third character object 503 is completed in FIG. 10B, the mobile terminal 100 is able to display the registered counterpart information Mina on the third character object 503 within the currently displayed image.

FIGS. 11A to 11E are diagrams for modifying photo or name information on a character object included in an image according to the present invention. For clarity and convenience, counterpart information on a second character object 502 is incorrectly displayed within a currently displayed image.

Figure 11A:
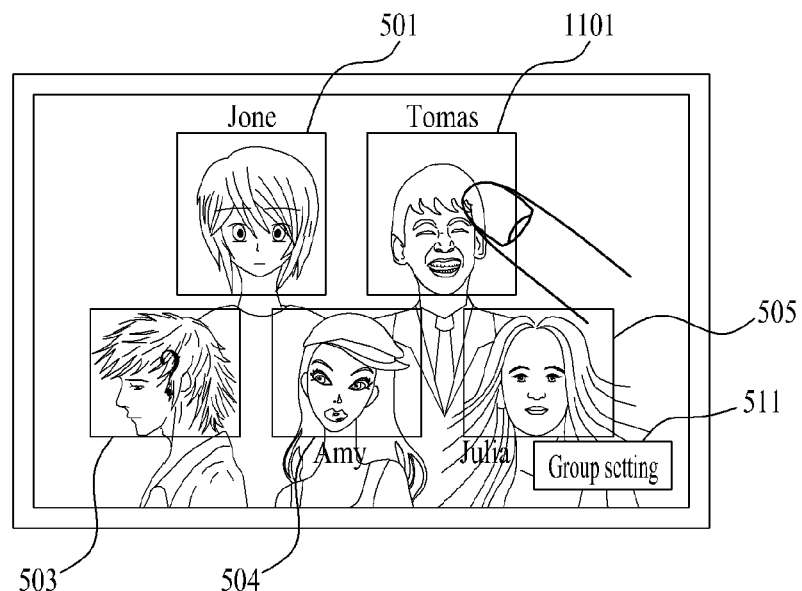
FIGS. 11A to 11E are diagrams for modifying photo or name information on a character object included in an image according to the present invention.
Figure 11B:
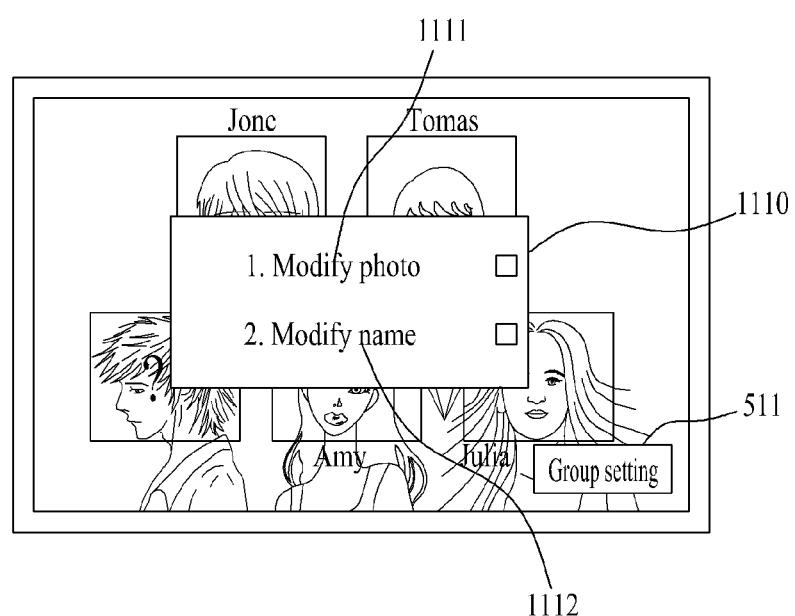

First of all, in case of receiving an input of a user selection action on a second character object 502 of which counterpart information 1101 is incorrectly displayed [FIG. 11A], the mobile terminal 100 is able to display a window 1110 for enabling a user to select whether to modify a photo ['modify photo' 1111] or counterpart information (e.g., name) ['modify name' 1112] [FIG. 11B].

Figure 11C:
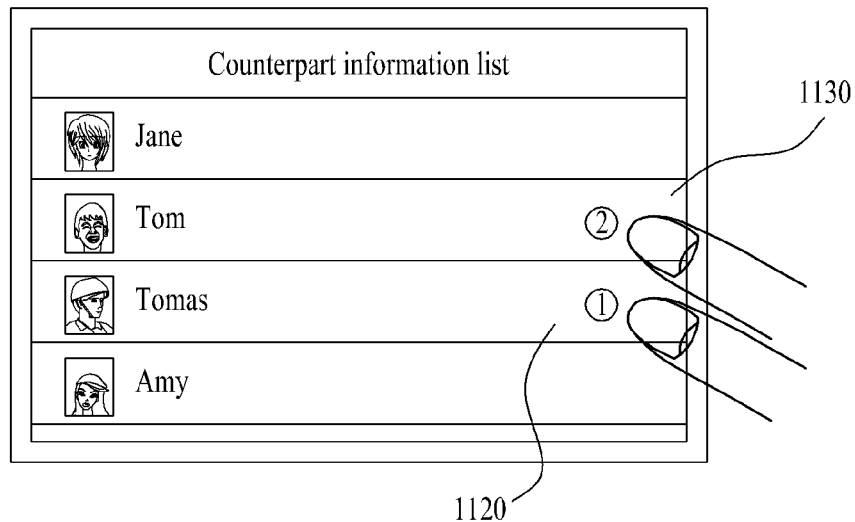

Referring to FIG. 11C, if the 'modify photo' 1111 is selected in FIG. 11B, the mobile terminal 100 displays a counterpart information list and is then able to receive a selection (1) of a counterpart image 1102 corresponding to the incorrectly displayed counterpart information 1120 on the second character object 502 in the counterpart information list.

Figure 11D:
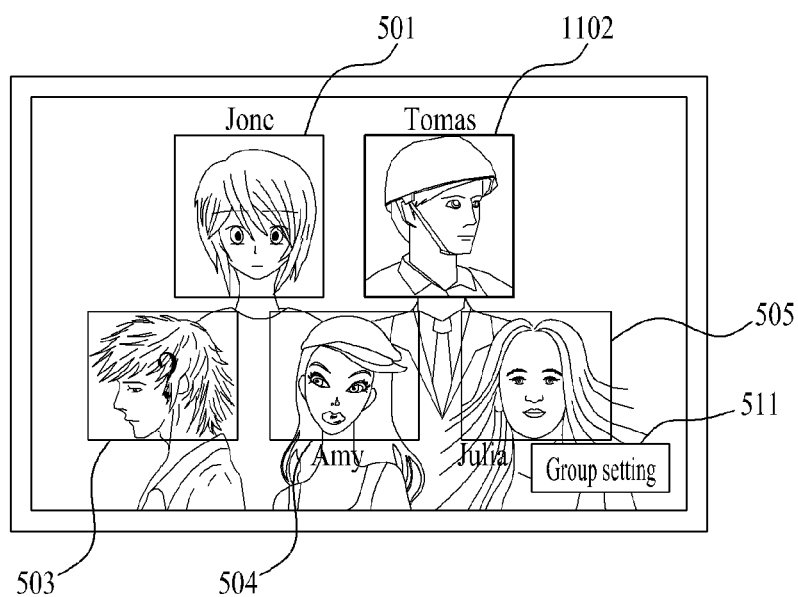

Therefore, the mobile terminal 100 is able to display the selected counterpart image 1102 to substitute for an image part corresponding to the second character object 502 [FIG. 11D].

Alternatively, referring to FIG. 11C, if the 'modify name' 1112 is selected in FIG. 11B, the mobile terminal 100 displays a counterpart information list and is then able to receive a selection (2) of a correct counterpart information 1130 on the second character object 502 in the counterpart information list.

Figure 11E:
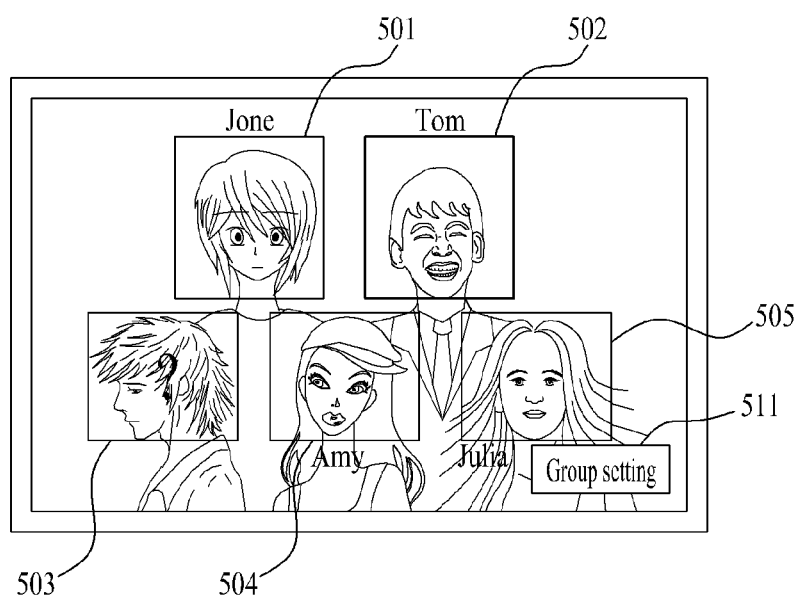

Therefore, the mobile terminal 100 is able to display the correct counterpart information 1130 selected in FIG. 11C as the counterpart information on the second character object 502 instead of displaying the incorrectly displayed counterpart information [FIG. 11E].

Figures 12A, 12B:
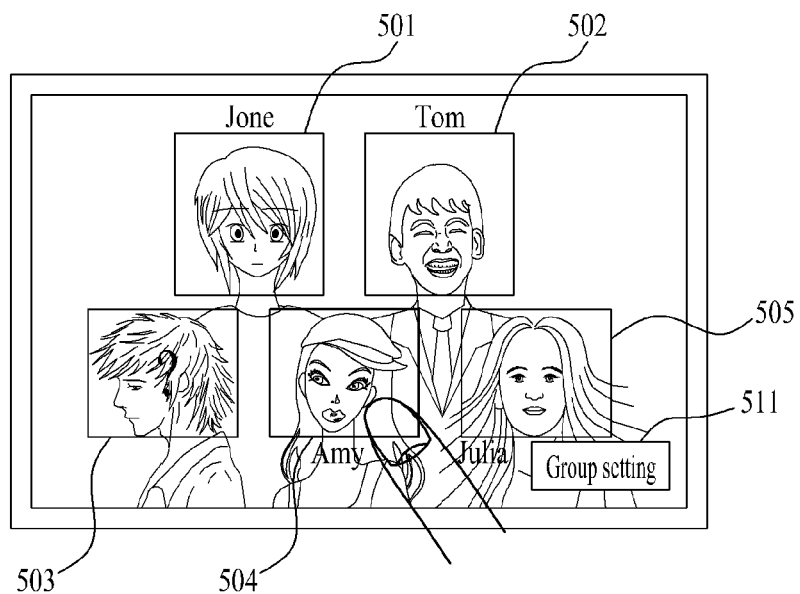
FIG. 12A and FIG. 12B are diagrams for editing user information on a pre-registered character object included in an image according to the present invention.

FIG. 12A and FIG. 12B are diagrams for editing user information on a previously registered character object included in a currently displayed image according to the present invention.

Referring to FIG. 12A, in case of receiving a selection of a fourth character object 504 of which counterpart information is previously registered within a currently displayed image from a user, the mobile terminal 100 is able to receive an input of an information change command signal for the fourth character object 504.

Referring to FIG. 12B, the mobile terminal 100 displays a screen for changing counterpart information corresponding to the fourth character object 504 and is then able to receive an input of counterpart information to change from the user using the displayed screen.

Therefore, the mobile terminal 100 is able to change the counterpart information corresponding to the fourth character object 504 with reference to the inputted counterpart information.

Figure 13A:
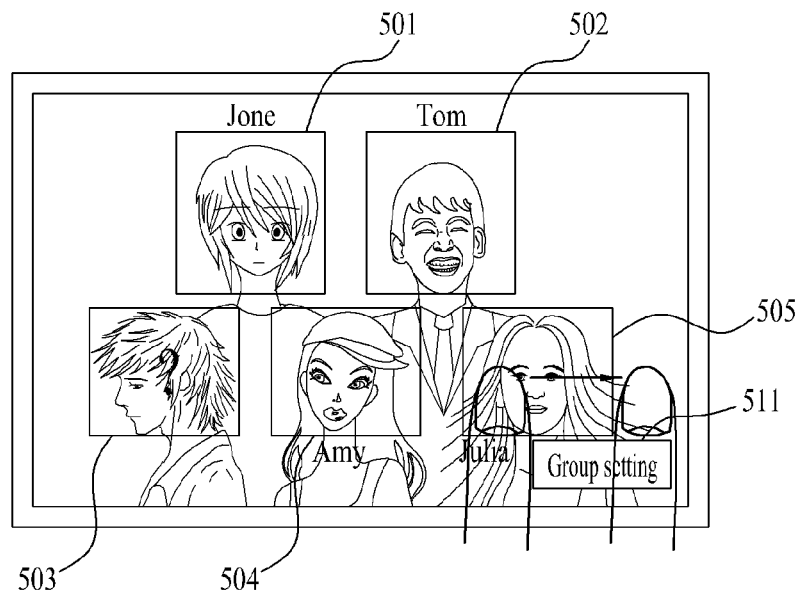
Figure 13B:
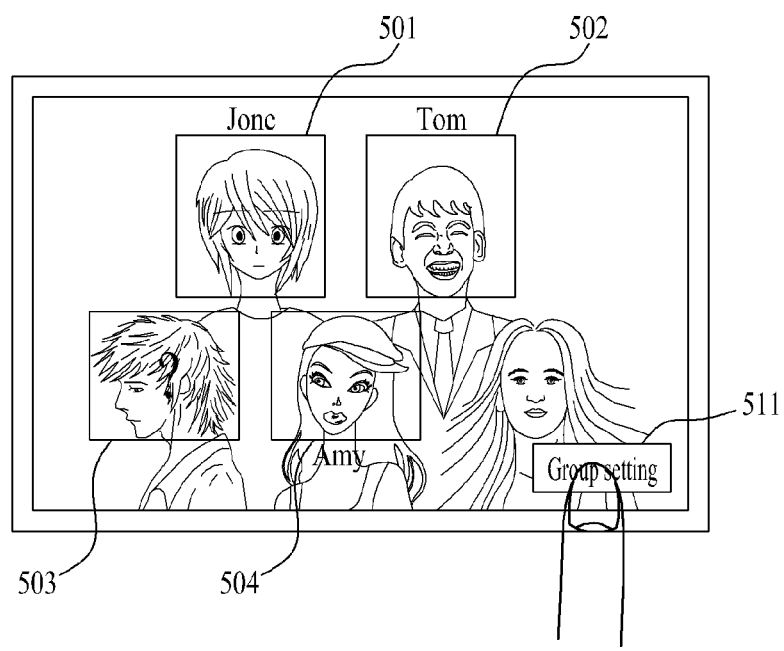

FIGS. 13A to 13C are diagrams for generating a group including counterparts corresponding to the rest of character objects except a specific character object among a plurality of character objects included in a currently displayed image according to the present invention.

Referring to FIG. 13A, the mobile terminal 100 is able to receives an input of a touch & drag action with a predetermined distance in one direction from one point of a fifth character object 505 among a plurality of character objects included in a currently displayed image.

In case of receiving the input of the touch & drag action on the fifth character object 505, the mobile terminal 100 receives a delete command signal for deleting the fifth character object 505 and is then able to delete the fifth character object 505 from a group to be generated.

Of course, the delete command signal can be inputted in various ways as well as the above mentioned touch & drag action.

Referring to FIG. 13B, in case of receiving the input of the delete command signal for the fifth character object 505, the mobile terminal 100 may not further display an object region display for the fifth character object 505 and counterpart information on the fifth character object 505 within the currently displayed image.

Referring to FIG. 13C, in case of receiving an input of a group setting command signal in FIG. 13B, the mobile terminal 100 is able to generate a group including the rest of counterparts Jane, Tom and Amy except the counterpart Julia corresponding to the fifth character object 505 among a plurality of the counterparts Jane, Tom, Amy and Julia corresponding to previously registered character objects 501, 502, 504 and 505.

In doing so, assume that character objects, of which counterpart information is previously registered, can be basically included in the generated group.

Therefore, according to a preferred embodiment of the present invention, a mobile terminal comprises a display unit displaying at least one image including one or more character objects, a user input unit receiving an input of a group generation command signal, and a controller generating a group including at least one counterpart corresponding to at least one of the character objects if receiving the input of the group generation command signal.

Moreover, the mobile terminal may comprise at least one of a camera for taking an image, a memory storing at least one image and a wireless communication unit receiving an image from an external server. The display unit may be adapted to display an image including at least one of an image inputted via the camera, an image stored in the memory and an image received from the external server under the control of the controller.

The mobile terminal may comprise a memory storing counterpart information of each of the at least one counterpart belonging to the generated group.

Preferably, the controller of the mobile terminal is further adapted to determine, whether counterpart information on each of the character objects is previously registered with the mobile terminal, and to control the display unit correspondingly to display, whether each of the character objects is previously registered. If the control unit determines that a character object has been previously registered, the display unit may for instance display at least part of the corresponding counterpart information of the corresponding character object. Alternatively or additionally, the display unit may display based on the determination result, which of the character objects is not yet registered. Possibly, the user input unit is adapted to receive an input of an information registration command signal for an unregistered character object among the plurality of character objects and an input of the counterpart information of the unregistered character object, wherein the inputted counterpart information is registered by the controller. Additionally or alternatively, the user input unit may be adapted to receive an input of an information change command signal for a registered character object of the plurality of character objects and an input of at least some counterpart information for the registered character object, wherein the controller is adapted to change at least some of the registered counterpart information based on the inputted counterpart information. Therefore, a user may change previously stored counterpart information, e.g. a phone number or an address or both. Preferably, the controller is adapted to generate a group including at least one counterpart corresponding to a registered character object of the plurality of character objects.

If a plurality of images is displayed, the controller may further be adapted to generate a group including counterparts of at least two different displayed images or of each of the displayed images, the counterparts corresponding to known (i.e. registered) character objects. Therefore, a first counterpart and a second counterpart having corresponding character objects displayed on different images may be included in one group. In case that at least one of the displayed images includes more than one character object, either all corresponding counterparts or at least one corresponding counterpart may be included in the generated group.

Preferably, the user input unit is adapted to receive a selection of at least one character object to be included in the group among the plurality of character objects. The controller may then be adapted to generate the group including the at least one counterpart corresponding to the at least one selected character object.

Alternatively or additionally, the user input unit may be adapted to receive an input of a delete command signal for deleting a specific character object from a plurality of character objects. If receiving an input of the delete command signal, the controller may be adapted to generate a group including counterparts corresponding to the character objects except for the deleted character object.

According to a further preferred embodiment of the present invention, a method of generating a group in a mobile terminal is provided. Preferably, the method is adapted to be employed in one of the above-mentioned embodiments of a mobile terminal according to the present invention.

In one embodiment, the method comprises the steps of displaying an image including one or more character objects; receiving an input of a group generation command signal; and generating a group including at least one counterpart corresponding to at least one of the character objects if receiving the input of the group generation command signal. The method may further comprise the step of determining, whether counterpart information of some or all of the character objects is previously registered in the mobile terminal. Here, the displaying step may comprise the step of displaying, whether each character object is previously registered. If it is determined that a character object is previously registered, the displaying step may further comprise the step of displaying at least some of the corresponding counterpart information on the corresponding character object, e.g. the name or the phone number. Additionally or alternatively, the method may comprise the steps of receiving an input of an information registration command signal for an unregistered character object among the character objects, if it is determined that at least one of the character objects is not yet registered; receiving an input of the counterpart information of the unregistered character object; and registering the inputted counterpart information.

Possibly, the method may comprise the steps of receiving an input of an information change command signal for a registered character object of the character objects; receiving an input of at least some counterpart information for the registered character object; and changing at least some of the registered counterpart information based on the inputted counterpart information.

Preferably, the method comprises the step of receiving a selection of at least one character object to be included in the group among the plurality of character objects, wherein the generating step comprises the step of generating the group including the counterpart corresponding to the at least one selected character object.

Accordingly, the present invention provides the following effects and/or advantages.

First of all, according to at least one of embodiments of the present invention, since counterpart information previously registered for each of a plurality of character objects included in a currently displayed image can be displayed within the image, the counterpart information on a specific character can be provided to a user without executing an address book related application.

Secondly, the present invention generates a group using a plurality of character objects included in a currently displayed image, whereby a counterpart corresponding to a character object included in the currently displayed image can be conveniently included as a member of the group without selecting a counterpart to include in the group in direct.

According to one embodiment of the present invention, the above-described group generating methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

It will be apparent to those skilled in the art that various modifications and variations can be made in the present invention without departing from the scope of the inventions. Thus, it is intended that the present invention covers the modifications and variations of this invention provided they come within the scope of the appended claims and their equivalents.

What is claimed is:

1. A mobile terminal, comprising:
   a touchscreen configured to display an image including a plurality of character objects;
   a memory configured to store an address book including counterpart information of a plurality of counterparts corresponding to the displayed plurality of character objects, respectively; and
   a controller configured to:
     perform a face recognition process based on the image for recognizing more than one of the displayed plurality of character objects,
     identify more than one counterparts corresponding to the more than one recognized character objects,
     receive, via the touchscreen, at least one touch input of at least one of the more than one recognized character objects on the image,
     select at least one identified counterpart as a result of the at least one received touch input of the at least one recognized character object to create a group including the at least one selected counterpart, the rest of the counterparts being unselected,
     search the address book for group information corresponding to the at least one selected counterpart,
     using the searched group information, and the at least one selected counterpart, create the group comprising the at least one selected counterpart according to a group generation input by a user, the created group excluding the unselected counterparts,
     register the created group in the address book, and
     display, via the touchscreen on a group screen, the created group, the at least one selected counterpart included in the group, and the unselected counterparts being excluded from the group,
     determine whether a subset group of the identified more than one counterparts corresponds to a previous group that has been registered, and
     in response to determining that the subset group corresponds to the previous group, display character objects corresponding to the previous group in a distinguished manner.

2. The mobile terminal of claim 1, wherein the image is at least one of a preview image, a stored image and an image received from an external server.

3. The mobile terminal of claim 1, wherein if counterpart information to be changed on at least one of the more than one recognized character objects is input by the user, the controller changes counterpart information on a counterpart corresponding to the at least one recognized character object with reference to the input counterpart information.

4. The mobile terminal of claim 1, wherein the recognized more than one character objects on the displayed image are individually selectable by a user input.

5. The mobile terminal of claim 1, wherein the controller is configured to generate the group based on the group generation input being at least one of a touch action, a drawing action, a touch and drag action and a gesturing action.

6. The mobile terminal of claim 1, wherein the controller is configured to create a group image corresponding to a previously generated group, the group image being composed of counterpart images corresponding to the at least one selected counterpart included in the group.

7. The mobile terminal of claim 6, wherein the group image is viewable in a photo album stored in the mobile terminal.

8. The mobile terminal of claim 6, wherein the group image is generated using a background image selectable by a user.

9. The mobile terminal of claim 1, wherein the controller is configured to transmit the image to the at least one selected counterpart using counterpart information respectively related to the at least one selected counterpart.

10. The mobile terminal of claim 1, wherein the controller is further configured to:
   display, on the group screen, an add key adjacent to each of the more than one identified counterparts for which a selection as a result of the at least one touch input was not received,
   receive, via the touchscreen, at least one add key touch input to add to the group at least one of the more than one identified counterparts for which a selection as a result of the at least one touch input was not received, and
   add, to the group, the at least one identified counterpart for which a selection as a result of the at least one touch input was not received and for which the at least one add key touch input was received.

11. The mobile terminal of claim 1, wherein the received at least one touch input includes a touch input of setting a region overlapping with the at least one of the more than one recognized character objects on the image.

12. The mobile terminal of claim 11, wherein the touch input of setting the region includes at least one of a touch and drag input and drawing a closed loop to set the region overlapping with the at least one of the more than one recognized character objects on the image.

13. A method of generating a group in a mobile terminal, the method comprising:
- displaying, on a touchscreen of the mobile terminal, an image including a plurality of character objects;
- storing an address book including counterpart information of a plurality of counterparts corresponding to the displayed plurality of character objects, respectively;
- performing a face recognition process based on the image for recognizing more than one of the displayed plurality of character objects;
- identifying more than one counterparts corresponding to the more than one recognized character objects;
- receiving, via the touchscreen, at least one touch input of at least one of the more than one recognized character objects on the image;
- selecting at least one identified counterpart as a result of the at least one received touch input of the at least one recognized character object to create a group including the at least one selected counterpart, the rest of the counterparts being unselected;
- searching the address book stored in a memory of the mobile terminal for group information corresponding to the at least one selected counterpart;
- using the searched group information, and the at least one selected counterpart, creating the group comprising the at least one selected counterpart according to a group generation input by a user;
- registering the created group in the address book;
- displaying, via the touchscreen on a group screen, the created group, the at least one selected counterpart included in the group, and the unselected counterparts being excluded from the group;
- determining whether a subset group of the identified more than one counterparts corresponds to a previous group that has been registered; and
- in response to determining that the subset group corresponds to the previous group, displaying character objects corresponding to the previous group in a distinguished manner.

14. The method of claim 13, wherein the displaying comprises displaying counterpart information on a corresponding character object, the displayed counterpart information including the identified counterpart for the corresponding character object.

15. The method of claim 13, further comprising:
- displaying, on the group screen, an add key adjacent to each of the more than one identified counterparts for which a selection as a result of the at least one touch input was not received;
- receiving, via the touchscreen, at least one add key touch input to add to the group at least one of the more than one identified counterparts for which a selection as a result of the at least one touch input was not received; and
- adding, to the group, the at least one identified counterpart for which a selection as a result of the at least one touch input was not received and for which the at least one add key touch input was received.

* * * * *